July 3, 1928.
J. H. GOULD
1,676,021
HEATER FOR MOTOR VEHICLES
Filed Jan. 31, 1927    2 Sheets-Sheet 1
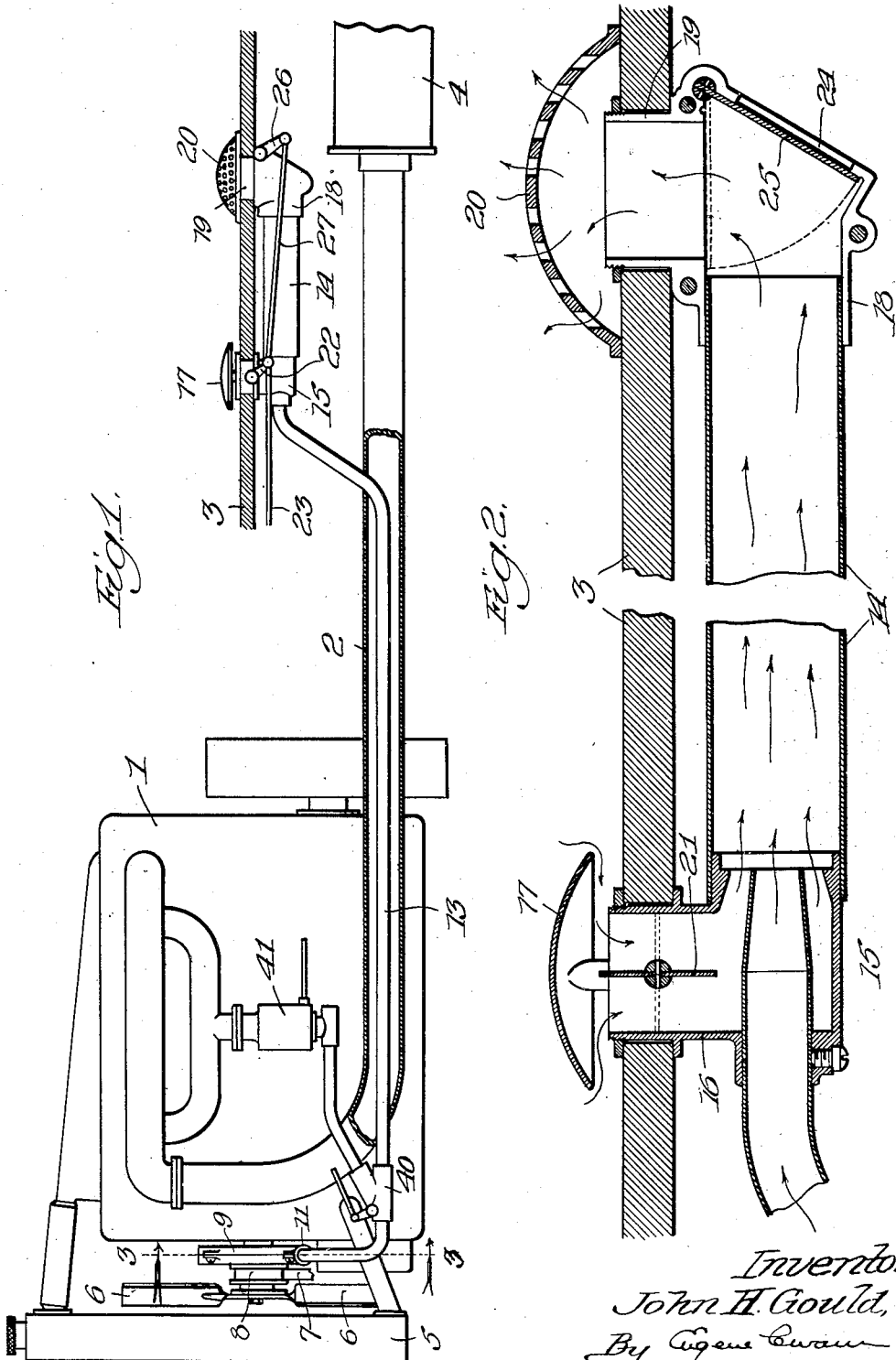
Inventor
John H. Gould,
By Eugene Ewan
Atty

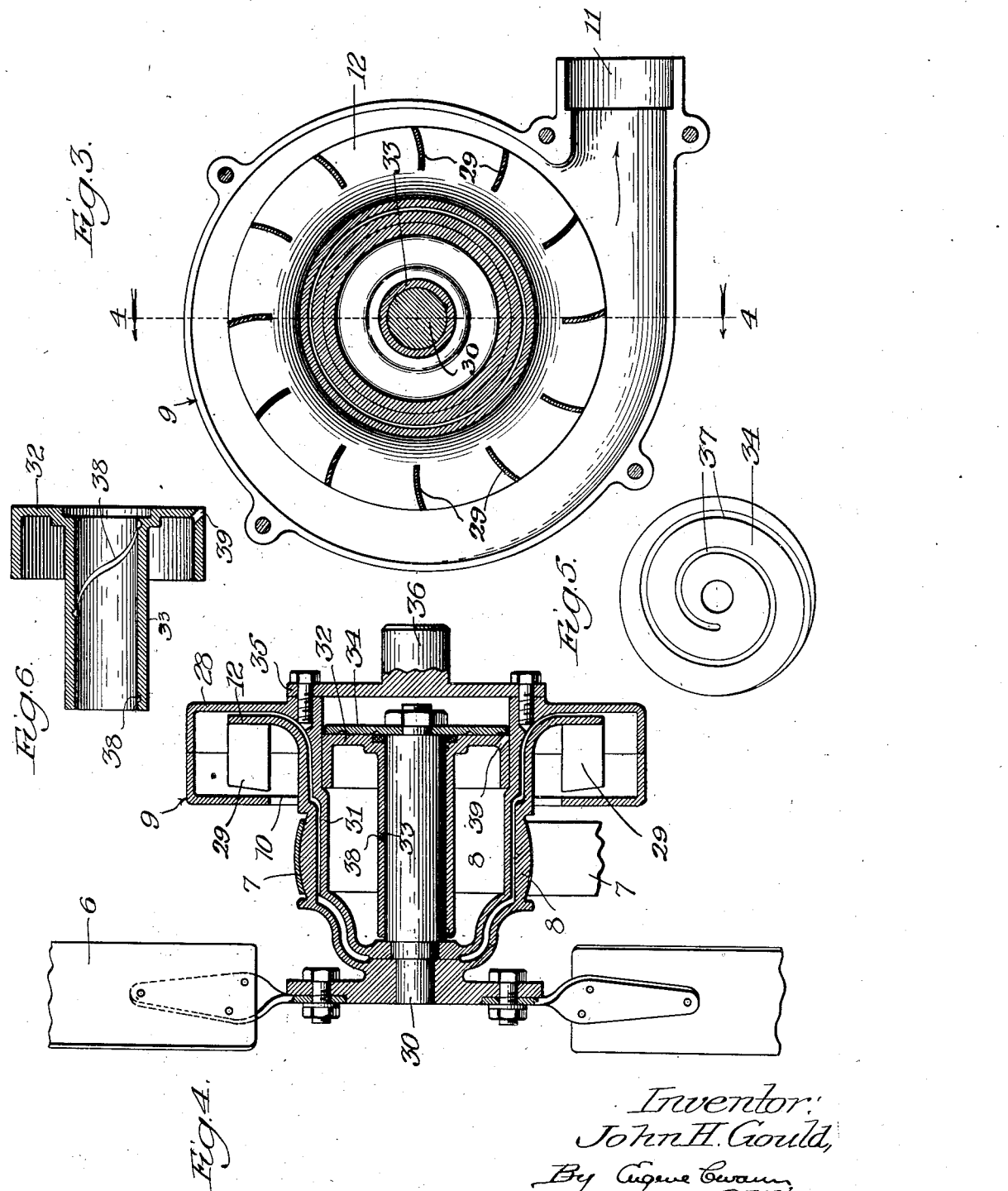

Patented July 3, 1928.

1,676,021

UNITED STATES PATENT OFFICE.

JOHN H. GOULD, OF DETROIT, MICHIGAN, ASSIGNOR TO McCORD RADIATOR & MFG. CO., OF DETROIT, MICHIGAN, A CORPORATION OF MAINE.

HEATER FOR MOTOR VEHICLES.

Application filed January 31, 1927. Serial No. 164,688.

This invention relates to heaters for motor vehicles and more particularly hot air heaters.

One object of my invention is to increase the amounts of heated air supplied to the body of the car or vehicle by mixing the air first heated by the exhaust gases from the explosion engine of the vehicle with air drawn into the mixing chamber from the body of the vehicle, and thus provide a more efficient heater.

Another object of my invention is to have the air intake of this mixing chamber at the floor of the car so as to take in the cooler air which tends to lie along the floor and thus insure heating the car body from top to bottom.

A further object of my invention is to provide dampers whereby the heater may be completely shut off when not wanted, or be partially closed so as to regulate the amounts of heated air which may be supplied to the car body.

A still further object of my invention is to provide the blower which is used to force air through the heater assembly and into the body of the car after being heated in combination with the fan of the radiator so that both may be driven by the engine through a pulley or equivalent element which is common between them.

The invention consists further in the matters hereinafter described and claimed.

In the accompanying drawings—

Fig. 1 is a view showing a heater assembly of my invention applied to a motor car;

Fig. 2 is an enlarged vertical longitudinal sectional view through the portion of the heater assembly at the floor of the car;

Fig. 3 is a vertical sectional view through the blower, taken on line 3—3 of Fig. 1;

Fig. 4 is a similar sectional view through the blower, taken on line 4—4 of Fig. 3; and Figs. 5 and 6 are views of details of structure as embodied in the blower mechanism.

The heater assembly of my invention is employed in combination with the explosion engine 1 of the motor vehicle and its exhaust pipe 2, which leads toward the rear of the car under the floor 3 thereof and discharges into a muffler 4, as in motor car design.

Arranged in front of the engine 1 is the usual radiator 5 forming a part of the cooling system for the engine and having a fan 6 in the rear of same to draw air through the radiator as in cooling systems of this general character. The fan 6 is driven from the engine 1 by a belt 7 which runs over a pulley 8 fixed to the hub of the fan, as shown in Figs. 1 and 4.

Associated with the fan 6 is an air blower 9, which as shown in the drawings is of the centrifugal type having a suitable air intake 10 about the axis of the fan, and an air outlet or discharge 11 tangential to the rotor or blower element 12 of the structure, as in devices of this general nature. (See Fig. 3.) Connected to the discharge 11 is an air conveying pipe or conduit 13, which extends for the greater portion of its length through the exhaust pipe 2, so that the hot exhaust gases passing through said pipe will raise the temperature of the section of the conduit 13 therein and thus heat the air forced through said conduit by the blower 9.

Located below the floor 3 of the car to the rear of the engine 1, is a hollow casing 14, which may be tubular in form. Secured to the front end of this casing is an elbow-like fitting 15 having an upwardly extending, tubular section 16, which extends upward through the floor 3 of the car and carries a cowl 17 over its upper end, as clearly shown in Fig. 2. This cowl is spaced above the floor 3 so as to allow cold air along the floor to be drawn into the fitting 15 and to be injected into the casing 14 by the heated air discharged into said casing from the discharge end of the conduit 13 which extends through the fitting 15 below and across its air intake section 16, as shown in Fig. 2. The discharge end of the conduit 13 is preferably reduced in diameter by tapering so as to provide a nozzle to increase the velocity of the heated air which is discharged from the conduit 13 and thus draw drafts of cold air into the fitting 15 through the air intake opening provided between the fitting and the cowl 17.

Another elbow-like fitting 18 is secured to the rear of the casing 14 and has an upwardly extending tubular section 19 extending upward through the floor 3 of the car, as shown in Fig. 2. A perforated register cap 20 is fitted over the upper end of the section 19 and through which heated air is supplied to the body of the car for warming purposes.

The casing 14 provides a mixing chamber for the cold air drawn into the same through the air intake 16 and the heated air supplied through the medium of the blower 9. This furnishes a larger volume of heated air for the interior of the car body than could be obtained should the heated air furnished through the conduit 13 be discharged directly into the car body. Thus the interior of the car is kept warmer and the occupants maintained comfortable even in very cold weather. In forcing heated air into the car body in accordance with my invention, a circulation of air within the car body is maintained and thus the air prevented from stratifying with the warmer air above and the colder air below to produce discomfort, as permitted with heaters as heretofore most generally used. Moreover, in creating this circulation of air in the car body, the colder portions of the air are caused to flow into the cold air intake 16 with much more freedom than would be produced by the ejector action alone at the discharge end of the conduit 13. The result is that my improved heater assembly is much more efficient than the exhaust heaters heretofore used, and sufficient volumes of heated air are supplied to the interior of the car to warm it from top to bottom and make for greater comfort, especially in cold weather when a heater is most needed and appreciated.

To shut off the cold air return 16, I provide a damper plate 21 therein. This plate is pivoted within the section 16 and may be swung into positions fully opening or closing the same, or into any intermediate position, depending on the amounts of heated air the occupants of the car may require. The axis member of this plate is provided with a handle 22 on the outside of the fitting 15 so that an actuating rod or member 23 may be connected therewith for adjusting the plate. The rod 23 may be provided with a suitable actuating member (not shown), which may extend up into the car body through the floor 3 for ready accessibility.

The fitting 18 is provided with an outlet opening 24 disposed in line with the casing 14, as shown in Fig. 2. Pivoted in the fitting 18 is a damper plate 25 arranged to be swung into a position either closing the opening 24 or closing the tubular extension 19 from below. When the plate 25 closes the opening 24, the full amount of the heated air mixed in the casing 14 is allowed to be discharged into the body of the car through the register cap 20, as shown in full lines in Fig. 2. On the other hand, when the plate 25 is swung upward to close the lower end of the extension 19, all of the heated air supplied by the casing 14 is discharged out through the opening 24 to the under side of the floor 3 of the car so as to furnish no heat therefor. The plate 25 is swung into this position when it is desired to cut off the supply of heat for the car, as would be the case in the summer and other warmer weather. For swinging the plate 25, I provide an arm 26. This arm is secured to the axis member of the plate and is outside of the fitting where it is connected by a link 27 with the arm 22 of the damper 21 so that both dampers may be moved simultaneously through the action of the one rod 23. By adjusting the damper between fully closed and fully open positions, the amount of heated air supplied to the car may be regulated.

The blower 9 is detailed in Figs. 3 and 4. As there illustrated, the blower has a two-part casing 28 surrounding the rotor 12, which is provided with a multiplicity of vanes or buckets 29 extending laterally outward from one side of the annular body of the rotor, as shown in Fig. 4. The portion of the casing 28 on the side of the rotor 12 having the body member is closed, while the opposite side of the casing is provided with the air intake 10, which is located just below the vanes or buckets 29, as shown in Fig. 4. The body portion of the rotor extends outward through the intake 10 and has the pulley 8 formed integral therewith outside of the casing. The casting which makes this part extends on to the hub of the fan 6 so that both the fan and the rotor of the blower may be operated through the medium of the pulley 8, which is common to both of them. The fan 6 is fixed to the outer end of a shaft 30, which extends axially through the pulley 8 and is supported by an annular portion 31 which is made integral with the casing 28 and extends inside of the pulley 8, as shown in Fig. 4. The front end of this member 31 extends to the shaft 30 on the inner side of the hub of the fan and there provides a bearing for the shaft. The portion 31 about the inner end of the shaft 30 is much larger than the diameter of the shaft and there has an annular member 32 pressed tightly in the same. This member carries a sleeve 33, which fits about the shaft 30 and provides a relatively long bearing therefor. A plate 34 is secured to the inner end of the shaft by a screw bolt, as shown, and holds the member 32 from working off the shaft. A plate 35 is clamped over the rear end of the casing 28 and has a rearwardly projecting stud or lug 36 by means of which the entire blower and fan assembly may be mounted on the engine block or other suitable support as may be provided therefor. The annular part 31 in conjunction with the closure plate 35 provides a lubricant containing chamber for the shaft 30. A spiral oil groove 37 (detailed in Fig. 5) is provided in the face of the plate 34 against the annular member 32 so as to carry lubricant to the shaft 30 in the rotation thereof. The sleeve 33 has a spiral groove 38 in the bore thereof, as shown in Fig. 6, so as to carry lubricant furnished by the groove 37 to the surface of the shaft 30 in said sleeve. The lubricant works out of the front end of the sleeve and again enters the lubricant chamber. This has an oil return passage 39 in the lower portion of the member 32 so as to feed lubricant to the groove 37.

The air conveying pipe 13, just after leaving the blower 9 and before entering the exhaust pipe 2, has a by-pass valve fitting 40 through the means of which air from the blower may be supplied to the carbureter 41.

The details of structure shown and described may be variously changed and modified without departing from the spirit and scope of my invention.

I claim as my invention:

1. A combined fan and centrifugal blower assembly of the character described, comprising a blower casing, a rotor in said casing and having vanes with the air intake of the casing arranged concentric with said vanes and the air discharge of the casing being tangential to said vanes, said rotor having an integral portion extending outward therefrom through said air intake, a fan connected with said integral portion, and a driving pulley on said portion between the blower and the fan.

2. A combined fan and a blower assembly of the character described, comprising a shaft, a blower casing surrounding said shaft and having an air intake and an air discharge, a fan to one side of said casing, a rotor in said casing and connected with said fan so that the two may be driven together, and an annular member fitted in said casing and having an elongated sleeve for supporting said shaft.

3. A combined fan and blower assembly of the character described, comprising a shaft, a blower casing surrounding said shaft and having an air intake and an air discharge, a fan to one side of said casing, a rotor in said casing and connected with said fan so that the two may be driven together, an annular member fitted in said casing and having an elongated sleeve for supporting said shaft, and a plate secured to one end of the shaft and extending over the said annular member, said plate and sleeve having spiral lubricant carrying grooves therein with a lubricant return opening in said annular member.

In testimony whereof I affix my signature this 27th day of January, 1927.

JOHN H. GOULD.